United States Patent Office 3,489,727
Patented Jan. 13, 1970

3,489,727
POLYTRIAZAPENTADIENE POLYMERS
Edwin Dorfman and William E. Emerson, Grand Island, Claude T. Bean, Jr., Niagara Falls, and Russell L. K. Carr, Grand Island, N.Y., assignors to Hooker Chemical Corporation, Niagara Falls, N.Y., a corporation of New York
No Drawing. Filed Mar. 11, 1966, Ser. No. 533,418
Int. Cl. C08g 33/06
U.S. Cl. 260—78.4                          23 Claims

ABSTRACT OF THE DISCLOSURE

This invention relates to triazapentadiene polymers having at least one triazapentadiene unit of the formula:

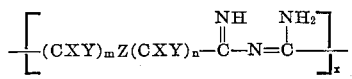

wherein each X is selected from chlorine and fluorine, each Y is selected from halogen and perhalo lower alkyl, $m$ and $n$ are positive integers greater than zero, $x$ is from one to one million, $-(CXY)_mZ(CXY)_n-$ is a divalent polyhalo organic radical where the sum of $m$ plus $n$ plus the number of equivalent units in Z is at least four and Z is at least one member of the group of perhalo lower alkylene, perhalo lower alkylidene, omega-hydroperhalo lower alkylidene, keto, oxy, thio, sulfoxide, sulfone

wherein R is selected from perhalo lower alkyl and omega-hydroperhalo lower alkyl, polyperfluorooxyalkylene where each alkylene unit has from two to ten carbon atoms and the units are from 2 to 35 in number, poly(perfluoroalkylene dioxy) where each alkylene unit has from two to ten carbon atoms and the units are from 2 to 35 in number, perfluoroalkylene dioxy, perhalo lower alkylamino, perhalocyclopentylene, perhalocyclohexylene, perhalopyridinediyl, perhalopyrazolidinediyl, perhalopyranylene, perhalopiperidylene, perhalophenylene, perhalonaphthalenediyl, perhalodecalinylene, oxadiazolylene, triazolylene, triazinylene and aryl perhalo lower alkylene wherein substituents on the said aryl group are selected from hydrogen, lower alkenyl, chloro, fluoro, lower alkoxy, nitro, nitroso, cyano, and alkoxy carbonyl; and terminal groups individually selected from the group consisting of nitrile, amidine, $-(CXY)_mZ(CXY)_nCN$, alkyl imidates, thioalkyl esters, thioaryl esters, thiolalkyl esters, thiolaromatic esters, alkyl, omega-hydroperhaloalkyl, perhaloalkyl provided $x$ is greater than 2, perhaloalkene, perhaloalkyne, aryl, lower alkyl ester, aryl ester, carbourea, and perhalo lower alkyl amidine.

This invention relates to new and useful halogenated polymers and especially to fluorinated polymers containing triazapentadiene groups in the chain.

The triazapentadiene polymers of this invention have at least one triazapentadiene unit of the following general formula:

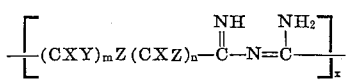

wherein the X's are halogens selected from chlorine and fluorine, and the Y's are selected from halogen and perhalo lower alkyl; $m$ and $n$ are positive integers greater than zero; $x$ is from one to one million;

$$-(CXY)_mZ(CXY)_n-$$

is a divalent polyhalo organic radical where the sum of $m$ plus $n$ plus the number of equivalent units in Z is at least four, and Z is a difunctional group defined below.

An object of this invention is to provide new halogenated polymers containing triazapentadiene groups in the polymeric chain.

It is another object of this invention to provide a process for the production of liquid low molecular weight polymers.

It is another object of this invention to provide a process for the production of solid polymers in contrast to liquid, low-molecular weight polymers.

Another object of this invention is to provide high molecular weight linear or essentially linear polymers which are soluble in organic solvents and which can be converted to linear or essentially linear soluble triazine polymers.

Another object is to provide new and useful solutions of high molecular weight polymers.

Various other objects and advantages of the present invention will become apparent to those skilled in the art from the accompanying description and disclosure.

According to the present invention the polytriazapentadiene polymer is formed by an addition type of reaction between halogen-containing organic dinitrile compounds and ammonia and/or diamidine compounds. This is illustrated by the following equations:

(1)                          $(x)\ NC(CF_2)_4CN + NH_2\overset{NH}{\overset{\|}{C}}(CF_2)_4\overset{NH}{\overset{\|}{C}}NH_2 \longrightarrow$

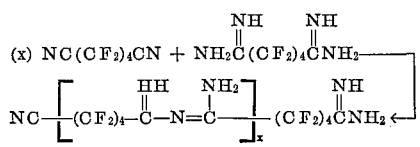

where $x$ is a positive integer from one to one million.

(2)      $(x)\ NC(CF_2)_4CN + NH_3 \longrightarrow$

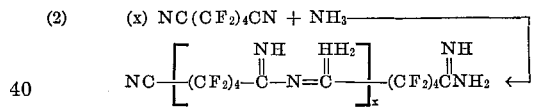

wherein $x$ is an integer from one to one million.

The haloalkylene groups, illustrated in Equations 1 and 2 by perfuorobutylene groups in both the dinitrile and the diamidine starting materials, respectively, to be used in this invention, include alkylene groups having at least 4 carbon atoms in which the carbon atoms alpha ($\alpha$) to the nitrile or amidine radical is perhalogenated and the carbon atom beta ($\beta$) to the nitrile or amidine radical is at least partially halogenated. The halogens are selected from the group consisting of fluorine, chlorine and mixtures thereof. Perfluoroalkylene groups are preferred, that is, an alkylene radical wherein all the hydrogen atoms have been replaced by fluorine atoms. In addition to perhaloalkylene groups, included within the scope of this invention are difunctional polyhalo organic radicals defined by the formula: $-(CXY)_mZ(CXY)_n-$, wherein the X's in any (CXY) group are halogens, the Y's in any (CXY) group are selected from halogen and perhalo lower alkyl, $m$ and $n$ are positive integers greater than zero, and the sum of $m$ plus $n$ plus the number of equivalent units in Z is at least four, and Z is selected from perhalo lower alkylene, perhalo lower alkylidene, omega-hydroperhalo lower alkylidene, keto, oxy, thio, sulfoxide, sulfone, polyperfluorooxyalkylene where each alkylene unit has from two to ten carbon atoms and the units are from 2 to 35 in number, poly(perfluoroalkylenedioxy) where each alkylene unit has from two to ten carbon atoms and the units are from 2 to 35 in number, perfluoroalkylenedioxy, perhalo lower alkylamino, perhalocyclopentylene, perhalocyclohexylene, perhalopyridenediyl, perhalopyrazolidinediyl, perhalopyranylene, perhalopiperidylene, perhalophenylene, perhalonaphthalenediyl, perhalodecalinylene, oxadiazolylene, triazolylene, triazinylene and aryl perhalo lower alkylene wherein substituents on the said aryl group are selected from hydrogen, lower alkenyl, chloro, fluoro, lower alkoxy, nitro, nitroso, cyano, and alkoxy carbonyl. The halogens represented by the X's and Y's can be the same or different halogens selected from the group consisting of chlorine, fluorine, and mixtures thereof. The above "lower alkyl" groups have from one to ten carbon atoms in them. The above-defined divalent polyhalo organic radical in the dinitrile starting material can be the same as, or different from, the above-defined divalent polyhalo organic radical in the diamidine starting material. Throughout this disclosure wherever "halogen" is referred to, it is intended to be those halogens selected from the group consisting of chlorine and fluorine.

Among the alkylene groups included within the scope of this invention are perfluoro lower alkylene, such as perfluorobutylene, perfluoropentamethylene and perfluorohexamethylene, branched chain alkylene groups, such as perfluoroethylbutylene, perfluoromethylhexamethylene, perfluorobutyldodecamethylene, phenylperfluorohexamethylene, substituted phenylperfluorohexamethylene where the substituents are selected from the chloro-, fluoro-, nitro-, nitroso-, nitrile, alkoxy, carbalkoxy, vinyl and styryl. A preferred alkylene group is a perfluoro lower alkyl tetramethylene group, especially the perfluoroethyltetramethylene group. The alkylene chain length can be from four to 45 carbon atoms in length, with four to 22 carbon atoms being an intermediate prefererd length, while chains of from four to 10 carbon atoms are the most preferred.

Another preferred divalent polyhalo organic radical is a polyperfluorooxyalkylene where each alkylene unit has from 2 to 10 carbon atoms and the units are from 2 to 35 in number.

The term "triazapentadiene," as used throughout the specification and claims, refers to a divalent radical of the formula:

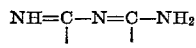

Conveniently, a perhaloalkylene dinitrile in a solvent is stirred, and finely divided perhaloalkylene diamidine is added to it continuously or intermitently as the reaction proceeds, until the desired degree of polymerization is obtained. Thus the molecular weight can be controlled to give a monotriazapentadiene compound as the lowest polymer by employing two moles of dinitrile and one mole of ammonia. Higher molecular weights are obtained as the stoichiometry approaches a molar ratio of one to one. The polymerization can also be controlled to produce bis triazapentadienes. It can also be controlled to give higher degrees of polymerization. In fact, substantially any desirable degree of polymerization can be obtained, for the polymerization takes place readily. It can also be controlled to give a polymer of 3000 monomer units. Still higher molecular weight polymers can also be obtained.

It is preferred to use pure or substantially pure starting materials in order to reduce the amount of chain termination.

The triazapentadiene polymers formed by reaction of these dinitriles with ammonia and/or diamidines will normally be terminated by nitrile or amidine groups. The presence of impurities in either the dinitrile, diamidine, diluent or equipment or the special nature of the manufacturing process causes the terminal groups on the triazapentadiene polymer to have other groups which may not participate in a polymerization reaction with a nitrile group or ammonia, or an amidine group. Thus, if the dinitrile contains perhaloalkyl nitrile, or omega-hydroperhaloalkylnitrile, the polymers are terminated, to some extent at least, with perhalo-alkyl or omega-hydroperhaloalkyl groups. If the dinitrile contains ester or amide functions, then terminal groups include the corresponding ester or amide group respectively.

Other terminal groups are embraced, such as, alkyl imidates, thioalkyl esters, thioaryl esters, thiolalkyl esters, thiolaromatic esters, alkyl groups, omega-hydroperfluoroalkyl groups, perhaloalkyl groups, perhaloalkene groups, perhaloalkyne groups, aryl groups such as phenyl, tolyl, nitrophenyl, chlorophenyl, methoxyphenyl, acetaminophenyl, and dimethylaminophenyl, lower alkyl ester groups, aryl ester groups, carbourea

groups, and perhalo lower alkyl amidine

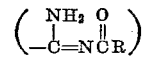

groups where R is selected from perhalo lower alkyl and omega-hydroperfluoro lower alkyl. These end groups would normally be derived to a substantial extent from the starting materials, including the impurities present.

Polymer branching can be introduced at the triazapentadiene group by the presence of an acylating compound which also contains a nitrile group. Thus, chlorocarbonyl-perhaloalkyl cyanides, which may be present in the dinitrile being used would acylate a triazapentadiene group, and cause growth of a polymer branch from the pendant nitrile group.

Other compounds which cause branching are nitrile carboxylic anhydrides, nitrile-dinitrophenyl esters, nitrile-sulfonic anhydrides, nitrile-phosphoric anhydrides, nitrile-carboxylic acid bromides, fluorides, and iodides, nitrile isocyanates, nitrile-carbodiimides, and the like. Very active dinitriles, such as perfluoromalononitrile, perfluorosuccinonitrile, and perfluoroglutaronitrile, could also react at a triazapentadiene group and initiate chain-branching.

It has been discovered that polymeric chains having nitrile terminal groups react with other polymeric chains having amidine terminal groups to give polymeric chains of higher molecular weight. It has also been discovered that the perhaloalkylene radical of the nitriles or amidines used need not be alike in all reacting species. Thus, for example, one particular perfluoroalkylene dinitrile may be reacted with a diamidine prepared from a different perfluoroalkylene dinitrile to give a copolymer. The process can also be effected with yet a third dinitrile or diamidine having yet a different type of perfluoroalkylene group to give a terpolymer, and so on, providing the proper dinitrile-diamidine stoichiometry is maintained.

In addition, low molecular weight polymers containing one kind of perhaloalkylene radical in the chain can be reacted with other low molecular weight polymers containing a different type of perhaloalkylene radical in the chain to give block polymers which are different from those described above.

As a special form of polymer, this invention includes the bis (triazapentadienes) of the type illustrated by the following compound

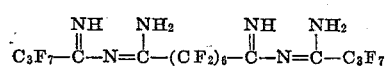

perfluorohexamethylene - bis(perfluoropropyltriazapentadiene). It has been found that only those bis(triazapentadienes) whose perhaloalkylene chain lengths are at least four carbons in length, or four atoms equivalent in length to four carbon atoms, are stable. That is, for instance, there is no bis(triazapentadiene) compound from perfluoroglutaronitrile and perfluorobutyramidine, but another isomeric composition is formed instead; which may have the following structure:

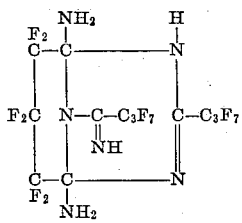

It has been found that perfluoroadiponitrile and perfluorobutyramidine form a triazapentadiene of intermediate stability and this also isomerizes on standing to another composition which may have the following structure:

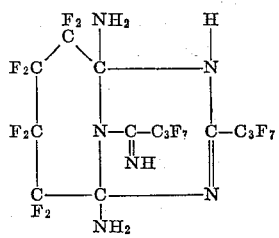

Likewise an isomeric composition is formed from reacting perfluorosuccinonitrile with perfluorobutyramidine, which may have the following structure:

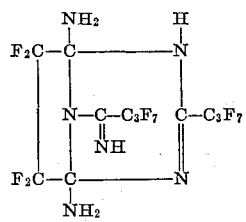

However, stable bis(triazapentadienes) are made by reaction of perfluorosuberonitrile with perfluorooctanamidine (perfluorocaprylamidine), which are stable for at least one year. There is also a stable bis(triazapentadiene) formed from perfluoroadiponitrile and perfluorocaprylamidine. Other stable bis(triazapentadiene) compounds have been prepared from reaction of perfluorosuberamidine with perfluorobutyramidine, and from perfluorosebacamidine with perfluorobutyronitrile and with perfluorocaprylonitrile.

Perfluorosuccinonitrile did not give crystalline compounds when reacted with either perfluorobutyramidine or perfluorocaprylamidine, but oils instead. Thus, the lower molecular weight adducts are not stable triazapentadienes, but the higher ones are. A general formula for such bis(triazapentadienes) of this invention, is

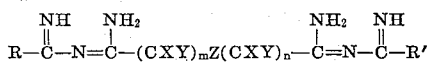

where R and R' are selected from perhalo lower alkyl and omega-hydroperfluoro lower alkyl, and the difunctional radical $-(CXY)_mZ(CXY)_n$ is as defined above.

Polymers in which the difunctional polyhalo organic triazapentadiene radicals are distributed in random order are obtained by reaction of mixtures of dinitriles with a diamidine or a mixture of diamidine in a molar ratio approaching 1:1.

A similar polymer is obtained by treating reaction of a mixture of dinitriles with ammonia in a molar ratio approaching 1:1. Co-monomers in addition to the above defined dinitriles may be used with the above defined dinitriles and diamidines.

Thus, a number of different polymers can be prepared in which the type of perhaloalkylene radicals can be connected in the chains in repeating, alternating, or in random order, or in blocks of like radicals, depending on the nature of the reacting species and the order in which they are permitted to react and, again, providing the proper dinitrile-diamidine and/or dinitrile ammonia stoichiometry be maintained.

The dinitriles employed in this invention are perfluoroadiponitrile, perfluorosuberonitrile, and perfluorosebaconitrile. Other dinitriles may also be used where the perhaloalkylene group numbers from four to forty-five per halomethylene units. The higher homologous dinitriles or their precursors can be prepared from intermediates which, in turn, can be prepared by known telomerization reaction procedures. The various longer chain materials are desirable because they permit the synthesis of block polymers having desirable properties in the ultimate triazine polymer over a wide temperature range. Such dinitrile include perfluoroadiponitrile, perfluorosuberonitrile, perfluoropimelonitrile, perfluoroazelanitrile, perfluorosebaconitrile, perfluorododecanedinitrile, perfluorooctadecanedinitrile, perfluorotetracosanedinitrile, perfluorotriacontanedinitrile, perfluorotetracontanedinitrile, and the like.

Since maintenance of desirable properties over a wide range of temperatures in the end-product triazine polymer is desired, the use of oxa-perfluoroalkylenedinitriles and branched perfluoroalkylenedinitriles which are otherwise very similar to perfluoroalkylenedinitriles are desirable for the polymer synthesis. Such dinitriles include 3-oxa-perfluorosebaconitrile 5,9 - dioxa-perfluorotetradecanedinitrile, oxa-perfluoropimelonitrile, oxaperfluoroadiponitrile, tetraoxa-perfluorotetracosanedinitrile, and pentaoxa-perfluorotriacontanedinitrile.

Branched perfluoroalkylenedinitriles, including perfluoro-3-ethyladiponitrile,
perfluoro-2-ethyladiponitrile,
perfluoro-3-propyladiponitrile,
perfluoro-3-methylpimelonitrile,
perfluoro-4-ethylpimelonitrile,
perfluoro-3-methylsuberonitrile,
perfluoro-4-propylsuberonitrile,
perfluoro-4-methylazelaonitrile,
perfluoro-5-butylsebaconitrile,
2,10-bis (trifluoromethyl)-3,9-dioxaundecanedinitrile,
2,11-bis(trifluoromethyl)-3,10-dioxadodecanedinitrile,
perfluoro-2-ethyl-3-methyladipronitrile,
perfluoro-3,5-dimethylsuberonitrile,
perfluoro - 3,6-diethylsebaconitrile and perfluoro-3,6-diethyl-9,13-dimethyloctadecanedioicinitrile are embraced within the starting materials of this invention.

The diamidines employed in this invention are those derived from the above dinitriles and the like. The diamidines are derived from the reaction of the corresponding dinitrile with ammonia, boiling out the excess ammonia, leaving the diamidine behind.

Among the specific triazapentadiene compounds or polymers embraced within the scope of this invention are:

perfluorotetramethylene bis(perfluoromethyl triazapentadiene),
perfluorohexamethylene bis(perfluoroheptyltriazapentadiene),
poly(perfluorohexamethylenetriazapentadiene),
poly(perfluorotetramethylenetriazapentadiene),
bis(6-cyanoperfluorohexyl)triazapentadiene,
bis(4-cyanoperfluorobutyl)triazapentadiene,
bis(8-cyanoperfluorooctyl)triazapentadiene,
bis(12-cyanoperfluorododecyl)triazapentadiene,
perfluorotetramethylene bis(perfluoropropyltriazapentadiene),
perfluorooctamethylene bis(perfluoropropyltrazapentadiene),
perfluorohexamethylene bis(6-cyanoperfluoroheptyltriazapentadiene),
perfluorotetramethylene bis(4-cyanoperfluorobutyltriazepentadiene), perfluorooctamethylene bis(8-cyanoperfluorooctyl-
triazapentadiene),
perfluorododecylene bis(12-cyanoperfluorododecyl-
triazapentadiene),
poly(perfluoropentamethylenetriazapentadiene),
poly(perfluorohexamethylenetriazapentadiene),
poly(perfluoroheptamethylenetriazapentadiene),
poly(perfluorooctamethylenetriazapentadiene),
poly(perfluorodecamethylenetriazapentadiene),
poly(perfluoroundecamethylenetriazapentadiene),
poly(perfluorododecamethylenetriazapentadiene),
poly(perfluorotridecamethylenetriazapentadiene),
poly(perfluorotetradecamethylenetrazapentadiene),
poly(perfluorotetramethyleneperfluorohexamethylene-
triazapentadiene),
poly(perfluorotetramethyleneperfluorooctamethylene-
triazapentadiene),
bis(5-cyano-oxa-perfluoroamyl)triazapentadiene,
bis(4-cyanoperfluoro-2-ethylbutyl)triazapentadiene,
bis(22-cyanoperfluorotetracosamethylene)-
triazapentadiene.

The block terpolymer:

poly(perfluorohexamethyleneperfluorododeca-
methyleneperfluorooctadecamethyleneper-
fluorotetracosamethylene)triazapentadiene,
poly(dioxa-perfluorooctamethylene)triazapentadiene,
and
poly(oxa-perfluoropentamethyleneperfluoro-
tetradecamethylene)triazapentadiene.

It has been found these dinitriles react to form diamidines when treated with ammonia. To some extent perfluoroadiponitrile forms the cyclo perfluoroadipimidine when treated with ammonia, but since this reacts with perfluoroalkyl nitriles more slowly than diamidines, and since it can be removed from perfluoroadipamidine, linear polymers can be made from it by the processes of this invention. Perfluoroglutaronitrile, perfluorosuccinonitrile and difluoromalononitrile do not give stable diamidines when treated with ammonia, and therefore have limited use in synthesizing linear polymers.

The polymerization process of this invention may be carried out between about minus 80 degrees and 120 degrees centigrade, but is conveniently carried out at ambient temperature, i.e., room temperature. Since heat is evolved by the reaction, cooling is desirable to avoid the possibility of vaporization of the dinitrile and reaction occurring out of the liquid reaction zone. At temperatures above about 120 degrees centigrade, the diamidine tends become unstable and decomposes. At temperatures below minus 80 degrees centigrade, the reaction may become sluggish. The preferred temperature range is between minus 30 and 70 degrees centigrade.

The reaction is controlled more easily if carried out in the presence of a diluent, inert under the conditions of reaction, but no diluent is necessary. Suitable diluents are 1,2-dimethoxyethane, diethylether, acetonitrile, and tetrahydrofuran. Of these, 1,2-dimethoxyethane is the preferred solvent for high molecular weight perfluoroalkylenetriazapentadiene polymers. Other solvents may be used, such as dioxane, diethylcarbitol, anisole, chloroanisole, dimethoxymethane, dimethylsulfoxide, tert.-butanol, non-halogenated nitriles as a class, such as benzonitrile, succinonitrile, glutaronitrile, and acetonitrile; perhalogenated aliphatic solvents such as perfluorokerosene, tetrachloroethylene, methylene chloride trichlorotrifluoroethane, perfluorotributylamine perfluoropyranes, difluorotetrachloroethane, fluorotrichloromethane, perfluoropyranes, perfluorotetrahydrofurans, and dibromotetrafluoroethane; certain ester solvents such as methylbenzoate, ethyl acetate, and propyl acetate; as well as other diluent solvent means such as dimethylacetamide tertiary amyl alcohol, isopropanol, nitromethane, hexafluoroxylene, benzotrifluoride, chlorobenzene, dichlorobenzene, benene, toluene, xylene, hexane, heptane, octanes, mineral spirits, α pinene, turpentine, and the like.

It is often advantageous to add finely divided diamidine compound as a solid or a slurry in an inert liquid to a concentrated solution or mixture of a dinitrile compound in reaction liquid. As the polymer increases in molecular weight and the solution becomes more viscous, additional inert liquid may be added until the desired viscosity and polymer molecular weight is obtained. The progress of the polymerization can be followed by measuring the viscosity and the amount of liquid used. It is preferable to use concentrated solutions since a larger proportion of low molecular weight macrocyclic compounds can be formed in a dilute reaction medium due to intramolecular reaction.

As another special form of the invention, the reaction can be controlled to give a monotriazapentadiene compound, illustrated by the formula:

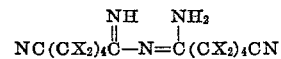

as the major product having two cyanoperhaloalkylene units.

These monotriazapentadiene polymers have the general formula:

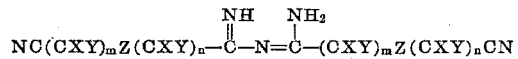

where the divalent group $-(CXY)_mZ(CXY)_n-$ is as defined above.

They are prepared by addition of ammonia to excess dinitrile, removing the unreacted dinitrile, to leave the monotriazapentadienedinitrile. These compounds give fluid bis(cyanoperhaloalkylene) triazines which are useful as such, and which may also be used as intermediates for the production of other polymers.

The reaction can also be carried out by adding ammonia to the concentrated solution or mixture of the dinitrile compound and inert liquid, instead of adding a diamidine. Dilution may be effected as the molecular weight increases. This technique is especially advantageous for making low molecular weight polymers.

Furthermore, the reaction can be carried out by adding the dinitrile in slight excess to a mixture of solid diamidine and inert liquid such as dimethoxyethane. When the low molecular weight polymer formation is complete, further polymerization is carried out by carefully controlled addition of ammonia to the polymer solution until a high molecular weight polymer is obtained.

Another polymerization method may be employed where the diamidine is prepared in situ with dinitrile, solvent, and ammonia within the polymerization vessel. The polymerization process may then be effected by the addition of dinitrile to the diamidine and liquid diluent until a high molecular weight polymer is obtained. The polymerization may also be affected by adding dinitrile in slight excess to the diamidine and higher polymer made by the further addition of small amounts of ammonia.

Still another polymerization, which gives only the difunctional triazapentadienes, is obtained by reaction of a dinitrile with a monodiamidine or by reaction of a diamidine with a mononitrile. An example of this reaction is shown in Equations 3 and 4

(3) 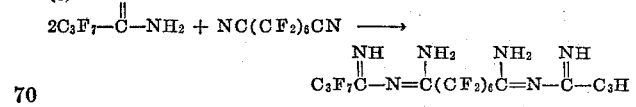

(4) 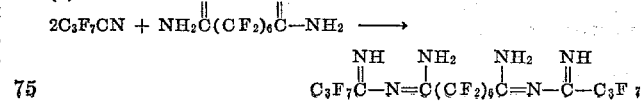

The perhaloorganic portion of the dinitriles and diamidines are defined by the formula —(CXY)$_m$Z(CXY)$_n$— as defined above. The polyhaloorganic portion of the said mononitriles and monoamidines can be the same or different and selected from perhalo lower alkyl, and omega-hydroperfluoroalkyl. These difunctional triazapentadiene materials can be converted to bis-triazinylene compounds which are useful as fluids or to higher molecular weight triazine polymers or copolymers.

The novel polymers of the present invention are not thermally stable as such above about 120 degrees centigrade, but when treated as described in copending application Ser. No. 533,430, filed Mar. 11, 1966, they are converted to soluble thermally stable poly(perhaloalkylenetriazine) polymers, useful as gaskets, seals, sealants, O-rings, bladders, tires, hose, greases, lubricants, hydraulic fluids, wire insulation and the like.

The following examples will further illustrate the nature of the present invention; however, the invention is not intended to be limited to these examples. Parts are by weight and temperatures in degrees centigrade unless otherwise indicated.

EXAMPLE 1

Preparation of poly(perfluorotetramethylenetriazapentadiene) followed by conversion to poly(perfluorotetramethyleneperfluoropropyltriazine)

To perfluoroadipamidine, 0.429 gram, in a 50 milliliter round-bottomed flask containing a magnetic stirrer, was added perfluoroadiponitrile, 0.397 gram, and acetonitrile, 5.5 milliliters. The mixture was stirred and allowed to warm to ambient temperature, 25 degrees centigrade. In two hours the mixture was homogeneous. The solution was concentrated to a residue which was dried under vacuum.

The perfluorotetramethylenetriazapentadiene polymer residue had a reduced viscosity of 0.02 at 0.5 gram per deciliter in tetrahydrofuran.

Conversion to triazine polymer with perfluorobutyric anhydride gave poly(perfluorotetramethyleneperfluoropropyltriazine), a viscous grease with a characteristic triazine absorption band at 1550 cm.$^{-1}$.

EXAMPLE 2

Preparation of poly(perfluorohexamethylenetriazapentadiene) and conversion to poly(perfluorohexamethyleneperfluoropropyltriazine)

To perfluorosuberamidine, 11.248 grams, and tetrahydrofuran, 30 milliliters, in a 100 milliliter round-bottomed flask at zero degrees centigrade was added perfluorosuberonitrile, 10.25 grams, in 75 minutes. The mixutre was allowed to warm to room temperature and was stirred for 5 days. A sample was dried under vacuum, and the perfluorohexamethylenetriazapentadiene polymer obtained was found to have an intrinsic viscosity of 0.35 deciliter per gram in tetrahydrofuran, and a molecular weight of 37,000, and had the appearance of a white rubbery gum.

The polymer was converted by reaction with excess perfluorobutyric anhydride to the corresponding triazine polymer which had a molecular weight of 33,000.

EXAMPLE 3

Preparation of copolymer poly(perfluorohexamethyleneperfluorooctamethylenetriazapentadiene)

To 10.5 grams of perfluorosuberonitrile, in 10 milliliters of dimethoxyethane, was added 6.72 grams of perfluorosebacamidine and perfluorosuberamidine (30:70 by weight mixture) in 48 hours with stirring in a nitrogen gas atmosphere at room temperature. Then 5 milliliters of dimethoxyethane were added. In the next 48 hours, 2.39 grams more of perfluorosuberamidine, were added, and 15 milliliters more dimethoxyethane. The temperature was then raised to 50 to 55 degrees centigrade and perfluorosuberamidine and dimethoxyethane were added in portions intermittently during 18 days until 11.55 grams of amidine and 95 milliliters of dimethoxyethane had been added. The resultant perfluorohexamethyleneperfluorooctamethylenetriazapentadiene copolymer had an intrinsic viscosity in dimethoxyethane of 1.0 deciliter per gram. The molecular weight, determined by membrane osmometry, was 100,000.

EXAMPLE 4

Preparation of poly(perfluorohexamethylenetriazapentadiene)

To 23.5 grams of perfluorosuberonitrile and 17 milliliters of 1,2-dimethoxyethane in the nitrogen atmosphere at zero degrees centigrade, ammonia was added with stirring. When 980 milliliters of ammonia had been consumed, 20 milliliters more of 1,2-dimethoxyethane were added. When 1100 milliliters of ammonia had been consumed, 22 milliliters of 1,2-dimethoxyethane were added. After 1320 milliliters of ammonia had been consumed, 10 milliliters more of 1,2-dimethoxyethane were added. When 1374 milliliters of ammonia had been added, the reaction was considered finished, for the solution was partially gelled. The recovered perfluorohexamethylenetriazapentadiene polymer had an intrinsic viscosity of 0.355 deciliter per gram in 1,2-dimethoxyethane.

A similar reaction gave a poly(perfluorohexamethylenetriazapentadiene) product of intrinsic viscosity 0.13 deciliter per gram in 1,2-dimethoxyethane. Conversion by the process of Example 1, gave a triazine polymer having an intrinsic viscosity of 0.51 deciliter per gram in hexafluoroxylene.

Using the method of Example 4 by substituting perfluorooxapimelonitrile for perfluorosuberonitrile there can be obtained the corresponding poly(perfluorooxapentamethylenetriazapentadiene). By substituting perfluoroethyladiponitrile for perfluorosuberonitrile there can be obtained poly(perfluoroethyltetramethylenetriazapentadiene). By substituting perfluorotetradecane dinitrile for perfluorosuberonitrile there can be obtained poly(perfluorododecamethylenetriazapentadiene).

EXAMPLE 5

Preparation of poly(perfluorohexamethylenetriazapentadiene)

Perfluorosuberamidine (1.9740 grams) having a melting point of 188 to 190 degrees centigrade in 6 milliliters of anhydrous tetrahydrofuran was stirred magnetically in 50 milliliters round bottom flask in an ice bath. To this were added 1.747 grams of perfluorosuberonitrile in one minute, and the solution was stirred in ice for 17 hours. Particles of amidine were still observed, so additional nitrile was added until about 12 percent excess over the theoretical amount was consumed. The amidine was then completely dissolved. A sample of the product was removed for analysis. A small band at 4.35 microns in the infrared spectrum of the reaction mixture sample was observed, indicating the presence of excess nitrile groups. The unpurified amidine used may have had some free ammonia. A sample of the solution was dried under vacuum and gave a residue of inelastic film. The solid triazapentadiene polymer had an intrinsic viscosity in tetrahydrofuran of 0.36 deciliter per gram. The number average molecular weight in tetrahydrofuran by membrane osmometry was 37,000. Differential thermal analysis showed endotherms at 125 degrees centigrade and 186 degrees centigrade identified as melting and decomposition respectively in a melting point apparatus.

EXAMPLE 6

Preparation of poly(perfluorooctamethylenetriazapentadiene)

A round bottom flask was fitted with a gas inlet tube, a gas bubble counter in the inlet line, and a magnetic stirrer.

In it a solution of perfluorosebaconitrile, 15 grams and 32 milliliters of tetrahydrofuran was kept saturated with anhydrous ammonia for two hours. Condensation products of ammonia and the dinitrile were thereby formed as intermediates, which broke down in the presence of excess ammonia to give perfluorosebacamidine as a white solid which precipitated out, as perfluorosebacamidine. More perfluorosebaconitrile, 15 grams, was then added until the solid perfluorosebacamidine was all consumed, as evidenced by its being dissolved. A sample was removed for analysis. The infrared absorption spectrum showed a nitrile peak at 4.35 microns. Ammonia was then added in small volumes until the nitrile absorption peak disappeared and the solution became viscous. A sample was dried under vacuum, probably incompletely, to give a slightly tacky triazapentadiene polymer of intrinsic viscosity of 0.38 deciliter per gram. The differential thermal analysis (DTA) showed a continuous endotherm to the melting point of 147 degrees centigrade. In a sealed tube the sample started to wet the glass wall at 100 degrees centigrade with complete fusion at 156 degrees centigrade. An endotherm at 189 degrees centigrade was associated with a decomposition which was observed in a melting point tube.

EXAMPLE 7

Preparation of poly(perfluoropropylcyanoperfluoropropylperfluorohexamethylenetriazine) and vulcanization thereof A poly(perfluorohexamethylenetriazapentadiene) polymer was prepared by the addition of perfluorosuberamidine to perfluorosuberonitrile in 1,2-dimethoxyethane. A polymer of intrinsic viscosity 0.9 deciliter per gram was obtained. The polymer, in dimethoxyethane solution, 65 grams (13.7 percent by weight of polymer), was added from an addition funnel with stirring to a mixture of perfluorobutyric anhydride, 72 grams, and 4-cyanoperfluorobutyryl chloride, 28 grams, in a closed round-bottomed flask, which was vented occasionally to release hydrogen chloride which was formed as a by-product. The mixture was stirred 30 minutes, then the volatile materials were removed by vacuum distillation to 150 degrees centigrade at 0.1 milliliter of mercury. A sample of the recovered triazine polymer, 2.5 grams (reduced viscosity, 0.25 at 0.3348 gram per deciliter), was milled with silver oxide, 0.25 gram, and molded at 130 to 160 degrees centigrade. The molded specimen had a tensile strength of 1030 pounds per square inch at 75 percent elongation and was vulcanized.

The 4-cyanoperfluorobutyryl chloride used in the above example is believed to be a new composition of matter, and separately claimed in Ser. No. 573,195 filed Aug. 18, 1966.

EXAMPLE 8

Preparation of adduct of perfluoroglutaronitrile and perfluorobutyramidine

The adduct was prepared by addition of perfluoroglutaronitrile, 80.6 grams, in 150 milliliters of benzene (sodium dried) to perfluorobutyramidine, 169 grams (sublimed), in 1000 milliliters of benzene at 40–45 degrees centigrade in one hour. The solution was heated to 80 degrees centigrade, then immediately allowed to cool and stand overnight at room temperature. Filtration gave 192 grams of crude adduct, melting point 104–116 degrees centigrade. This was recrystallized twice from 1600 milliliters of dry benzene, heating to 60 degrees centigrade. In the second recrystallization attempt, 54 grams of insoluble solid, melting point 124–128 degrees centigrade, and a crop of 59 grams, melting point 107–110 degrees centigrade were obtained. The solid which melted at 124–128 degrees centigrade was again heated with dry benzene, dried at 56 degrees centigrade at one millimeter mercury, to give solid melting at 126–128 degrees centigrade. The ultraviolet spectrum in methanol had a maximum at 220 millimicrons; E, 8930.

Analysis.—Calculated for $C_{11}H_6F_{20}N_6$ (percent): C, 24.93; F, 60.7; H, 1.09; N, 13.53. Found: C, 25.13; F, 60.88; H, 1.15; N, 13.97.

The adduct was similarly prepared by adding the nitrile at 5 degrees centigrade and allowing the mixture to stand at room temperature two days. The yield of adduct, melting point 108–114 degrees centigrade, was 87 percent.

EXAMPLE 9

Preparation of adduct of perfluoroglutaronitrile and perfluorocaprylamidine

The compound was prepared by the method described above. The crude product, melting point 92–97 degrees centigrade, was obtained in 88 percent yield. Two recrystallizations from chloroform raised the melting point to 110–112 degrees centigrade.

Analysis.—Calculated for $C_{21}H_6N_6F_{36}$ (percent): C, 24.57; H, 0.59; N, 8.19; F, 66.65. Found: C, 24.78, 24.91; H, 0.57, 0.61; N, 8.59, 8.87; F, 66.7, 67.0.

EXAMPLE 10

Preparation of bis(perfluoroheptyl)perfluorotetramethylenetriazapentadiene

Using perfluoroadiponitrile and perfluorocaprylamidine and the procedure described for the adduct of Example 8, there was obtained bis(perfluoroheptyl)perfluorotetramethylenetriazapentadiene, melting point 104–107 degrees centigrade in 87 percent yield. The compound was recrystallized once from benzene (95 percent recovery) and once from chloroform (87 percent recovery) melting point 104–106 degrees centigrade. This material had an ultraviolet maximum at 245 millimeters (E=15,000) in methanol. The above material, after two further recrystallizations from chloroform, melted at 106–108 degrees centigrade. The infrared absorption spectrum showed bands at 2.9, 3.0, 6.1, 6.3, 8.9, 9.7, 10.1, 11.8, and 14.0 microns, typical for a triazapentadiene compound.

Analysis.—Calculated for $C_{22}H_6N_6F_{38}$ (percent): C, 24.55; H, 0.56; N, 7.81; F, 67.1. Found: C, 25.03, 25.05; H, 0.68, 0.49; N, 9.2, 8.87; F, 69.1, 68.1.

EXAMPLE 11

Preparation of bis(perfluoroheptyl)perfluorotetramethylenetriazapentadiene

Bis (perfluoroheptyl) perfluorotetramethylenetriazapentadiene was also prepared by adding perfluoroadipamidine, 2.0 grams (0.007 mole), to a solution of perfluorocaprylonitrile, 5.5 grams (0.014 mole), in 100 milliliters of dry benzene. The mixture was heated 0.5 hour at 45 degrees centigrade and then briefly to 80 degrees centigrade. The reaction mixture was filtered while still warm (1.3 grams material), melting point 185–195 degrees centigrade and the filtrate allowed to cool. The crude product (melting point 97–102 degrees centigrade) was recrystallized from chloroform, melting point 102–103 degrees centigrade. The infrared spectrum showed identity with the preparation of Example 10.

EXAMPLE 12

Preparation of adduct of perfluoroadiponitrile with perfluorobutyramidine

A solution of perfluoroadiponitrile (9.5 grams, 0.038 mole) in 20 milliliters anhydrous ether was added over a period of 0.5 hour to a solution of perfluorobutyramidine (15.9 grams) in dry ether at 5 degrees centigrade. After standing one hour at room temperature, the cloudy solution was filtered. Removal of the ether at reduced pressure left low melting, white crystals, 21.5 grams (85 percent). The product was very soluble in benzene, chloroform, carbon tetrachloride, methylene chloride, and ether; and quite soluble in hexane and petroleum ether. The compound was recrystallized from FC-75 Solvent (containing perfluoroalkylpyrans) melting point 44–45 degrees centigrade.

*Analysis.*—Calculated for $C_{14}H_6N_6F_{22}$ (percent): C, 24.86; H, 0.89; N, 12.43; F, 61.8. Found: C, 25.08, 25.08; H, 0.99, 1.17; N, 13.12, 13.19; F, 60.8, 61.9. In methanol, the compound had ultraviolet maximum at 266 millimeters (E=14,800); the infrared spectrum was similar to the non-triazapentadiene adduct of perfluoroglutaronitrile and perfluorobutyramidine with infrared absorption bands at 3.0, 2.9, 3.1, 6.1, 6.3 and 8–9, 9.9, 10.4, 11.7, 13.2, 13.5 microns.

EXAMPLE 13

Preparation of perfluorohexamethylene bis(perfluoroheptyltriazapentadiene)

To a slurry of 11.70 grams, (0.0284 mole) in 40 milliliters of anhydrous FC-75 Solvent (containing perfluoroalkylpyrans), 4.95 grams (0.0141 mole) of perfluorosuberonitrile was added in 2 hours and the mixture then stirred for 18 hours. The solid product was then filtered, recrystallized twice from benzene, and dried under vacuum. Melting point 115–6 degrees centigrade. The melting point was rechecked after 12 months and found to be the same.

*Analysis.*—Calculated for $C_{24}H_6F_{42}N_6$ (percent): C, 24.50; H, 0.51; F, 67.84; N, 7.15. Found: C, 24.68; H, 0.66; F, 67.32; H, 6.95. In tetrahydrofuran, the compound had ultraviolet maxima at 257 millimicrons (E=16,000) and at 320 millimicrons (E=1,610). The infrared spectrum had absorption at 2.9, 3.0, 6.1 and 6.3 microns, typical for a triazapentadiene structure.

EXAMPLE 14

Preparation of poly(perfluorotetramethyleneperfluorohexamethylenetriazapentadiene)

To perfluoroadiponitrile, 16.5 grams, and 1,2-dimethoxyethane, 35 milliliters, was added perfluorosuberamidine, 26.3 grams.

The addition was made during 24 hours, and additional dimethoxyethane, 45 milliliters, was added in portions during the reaction. The polymer had an infrared absorption spectrum typical of the triazapentadiene structure.

EXAMPLE 15

Preparation of poly(perfluorotetramethyleneperfluorohexamethylenetriazine)

The triazapentadiene polymer of Example 14, 25 grams in dimethoxyethane, was added with stirring to perfluorobutyric anhydride, 82 grams, in a period of two hours at 25 to 30 degrees centigrade. The polymer was recovered by vacuum distillation of the volatile material and vacuum drying of the residue. The polymer recovered had a reduced viscosity of 0.01 gram per deciliter and had infrared adbsorption at 6.4 microns, characteristic of the triazine group.

EXAMPLE 16

Preparation of perfluorohexamethylene bis(perfluoropropyltriazapentadiene)

Perfluorobutyramidine, 5.20 grams was mixed with perfluorosuberonitrile, 2.80 grams, with intermittent cooling to remove heat or reaction and maintain a temperature range of 25 to 50 degrees. After about 10 minutes the mixture had turned solid. Tetrahydrofuran, 2 milliliters, was adde and the mixture was stirred for 5 minutes. The volatile material was then removed at 50 degrees centigrade at 0.2 millimeter of mercury pressure. The residue melted at 55–60 degrees centigrade, but after recrystallization from benzene and drying, it melted at 55–58 degrees centigrade. The infrared absorption spectrum was typical for triazapentadiene compounds having bands at 2.9, 3.0, 6.1, 6.3, 8–9, 9.6, 9.8, 10.0, 10.6, 11.6 and 13.5 microns.

EXAMPLE 17

Preparation of perfluorooctamethylene bis(perfluoropropyltriazapentadiene)

To perfluorosebacamidine, 3.2 grams, and 1.2-dimethoxyethane, 50 milliliters, in a glass pressure tube on a vacuum manifold was added 15 milliliters of perfluorobutyronitrile. The solvent and excess perfluorobutyronitrile were removed under vacuum at 35 degrees centigrade, and the residue was recrystallized from benzene, yielding white crystals, melting point 76.5–77.5 degrees centigrade. The infrared spectrum had the typical triazapentadiene absorption bands at 2.9, 3.0, 6.1, and 6.3 microns.

EXAMPLE 18

Preparation of perfluorooctamethylene bis(perfluoroheptyltriazapentadiene)

In a sealed vessel equipped with a stirrer were mixed for 18 hours perfluorosebacamidine, 3.5 grams of perfluoroctanonitile, 15 milliliters, and 1,2-dimethoxyethane, 40 milliliters. The soluble material was removed at 35 degrees centigrade at 0.2 millimeter mercury pressure, and the residue was recrystallized from benzene, yielding white crystals, 6 grams, melting point 118.0–118.5 degrees centigrade. The infrared spectrum of the compound was like that of the previous example in the 2.5 to 8.0 micron portion of the spectrum, indicating the triazapentadiene structure.

EXAMPLE 19

Preparation of perfluoroheptyl bis(perfluorooctamethyleneperfluoromethyltriazine)

Bis (perfluoroheptyl) perfluorooctamethylenetriazapentadiene, 5 grams, was added to trifluoroacetic anhydride, 45 milliliters, and stirred for 18 hours. The volatile material was then removed at 30–100 degrees centigrade at 0.2 millimeter mercury vacuum. The residue was then distilled to yield bis(perfluorooctamethylene)perfluoroheptylperfluoromethyltriazine having a boiling point of 169 degrees centigrade at 0.25 millimeter mercury vacuum.

The infrared absorption spectrum of the distillate had a triazine absorption band at 6.4 microns.

*Analysis.*—Calculated for $C_{30}F_{52}N_6$ (percent): N, 7.42; Found: N, 6.8.

EXAMPLE 20

Preparation of bis(cyanoperfluoroalkyl)triazapentadiene

To perfluorosuberonitrile, 27 parts, at zero degrees centigrade were added ammonia gas, 0.26 part, with stirring, during five days. The unreacted dinitrile, 16 parts, was recovered by vacuum distillation. The residue was sublimed giving white solid bis(cyanoperfluoroheptyl)triazapentadiene, 3 parts, melting point 37.5 degrees centigrade, with infrared absorption bands at 1525, 1600, 1650 and 2250 reciprocal centimeters.

*Analysis.*—Calculated for $C_{16}H_3F_{24}N_5$ (percent): C, 26.64; H, 0.42; F, 63.23; N, 9.71. Found: C, 26.66; H, 0.79; F, 63.36; N, 9.45.

Using the method of Example 20 but substituting perfluorooxapimelonitrile for perfluorosuberonitrile there can be obtained the corresponding bis(cyanooxaperfluoroamyl)triazapentadiene.

By substituting perfluoroethyladiponitrile for perfluorosuberonitrile there can be obtained bis(cyanoperfluoroethylbutyl)triazapentadiene.

By substituting perfluorotetradecanedinitrile for perfluorosuberonitrile there can be obtained bis(cyanoperfluorodecyl)triazapentadiene.

As many widely different embodiments of this invention may be made without departing from the spirit and scope thereof, it is to be understood that this invention is not limited to the specific embodiments thereof.

We claim:
1. The triazapentadiene polymer having at least one triazapentadiene unit of the formula:

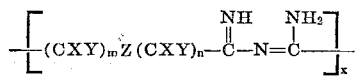

wherein each X is selected from chlorine and fluorine; each Y is selected from halogen and perhalo lower alkyl, $m$ and $n$ are positive integers greater than zero; $x$ is from 3000 to one million, —$(CXY)_m Z(CXY)_n$— is a divalent polyhalo organic radical where the sum of $m$ plus $n$ plus the number of equivalent units in Z is at least four and Z is at least one member of the group of perhalo lower alkylene, perhalo lower alkylidene, omega-hydroperhalo lower alkylidene, keto, oxy, thio, sulfoxide, sulfone, RN—O— wherein R is selected from perhalo lower alkyl and omega-hydroperhalo lower alkyl, polyperfluorooxyalkylene where each alkylene unit has from two to ten carbon atoms and the units are from 2 to 35 in number, poly(perfluoroalkylene dioxy) where each alkylene unit has from two to ten carbon atoms and the units are from 2 to 35 in number, perfluoroalkylene dioxy, perhalo lower alkylamino, perhalocyclopentylene, perhalocyclohexylene, perhalopyridinediyl, perhalopyrazolidinediyl, perhalopyranylene, perhalopiperidylene, perhalophenylene, perhalonaphthalenediyl, perhalodecalinylene, oxadiazolylene, triazolylene, triazinylene and aryl perhalo lower alkylene wherein substituents on the said aryl group are selected from hydrogen, lower alkenyl, chloro, fluoro, lower alkoxy, nitro, nitroso, cyano, and alkoxy carbonyl; and terminal groups individually selected from the group consisting of nitrile, amidine, —$(CXY)_m Z(CXY)_n CN$, alkyl imidates, thioalkyl esters, thioaryl esters, thiolalkyl esters, thiolaromatic esters, alkyl, omega-hydroperfluoroalkyl, perhaloalkyl, perhaloalkene, perhaloalkyne, aryl, lower alkyl ester, aryl ester, carbourea, and perhalo lower alkyl amidine.

2. The triazapentadiene polymer of claim 1 wherein $x$ is 3000 to one million and the —$(CXY)_m Z(CXY)_n$— radical is a perfluoroalkylene group of 4 to 45 carbon atoms.

3. The triazapentadiene polymer of claim 2 wherein the —$(CXY)_m Z(CXY)_n$— radical is a perfluoroalkylene group of 4 to 22 carbon atoms.

4. The triazapentadiene polymer of claim 2 wherein the —$(CXY)_m Z(CXY)_n$— radical is a perfluorotetramethylene group.

5. The triazapentadiene polymer of claim 2 wherein the —$(CXY)_m Z(CXY)_n$— radical is a perfluorohexamethylene group.

6. The triazapentadiene polymer of claim 2 wherein the —$(CXY)_m Z(CXY)_n$— radical is a perfluorooctamethylene group.

7. The triazapentadiene polymer of claim 2 wherein the —$(CXY)_m Z(CXY)_n$— radical is a perfluorododecamethylene group.

8. The triazapentadiene polymer of claim 2 wherein the —$(CXY)_m Z(CXY)_n$— radical is a perfluoro lower alkyl tetramethylene group, where the said perfluoro lower alkyl group has from one to ten carbon atoms.

9. The triazapentadiene polymer of claim 8 wherein the —$(CXY)_m Z(CXY)_n$— radical is a perfluoroethyltetramethylene group.

10. The triazapentadiene polymer of claim 1 wherein the —$(CXY)_m Z(CXY)_n$— radicals are perfluoroalkylene groups having 4 to 45 carbon atoms connected by triazapentadiene groups in repeating alternating or random order.

11. The triazapentadiene polymer of claim 10 wherein the perfluoroalkylene groups are perfluorohexamethylene and perfluorooctamethylene.

12. The triazapentadiene polymer of claim 10 wherein the perfluoroalkylene groups are perfluorotetramethylene and perfluorohexamethylene.

13. The triazapentadiene polymer of claim 10 wherein the perfluoroalkylene groups are perfluorotetramethylene and perfluorooctamethylene.

14. A block polymer in which at least one of the polymeric recurring units is the triazapentadiene polymer of the formula defined in claim 1.

15. The block copolymer of claim 14 wherein the recurring units contain —$(CXY)_m Z(CXY)_n$— radicals of perfluorotetramethylene and perfluorooctamethylene groups.

16. A monotriazapentadiene of the formula:

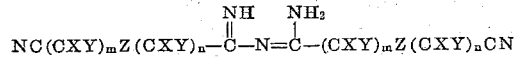

wherein each X is selected from chlorine and fluorine, each Y is selected from halogen and perhalo lower alkyl, $m$ and $n$ are positive integers greater than zero, $x$ is from one to one million, —$(CXY)_m Z(CXY)_n$— is a divalent polyhalo organic radical where the sum of $m$ plus $n$ plus the number of equivalent units in Z is at least four and Z is at least one member of the group of perhalo lower alkylene, perhalo lower alkylidene, omega-hydroperhalo lower alkylidene, keto, oxy, thio, sulfoxide, sulfone

wherein R is selected from perhalo lower alkyl and omega-hydroperhalo lower alkyl, poly-perfluorooxyalkylene where each alkylene unit has from two to ten carbon atoms and the units are from 2 to 35 in number, poly(perfluoroalkylene dioxy) where each alkylene unit has from two to ten carbon atoms and the units are from 2 to 35 in number, perfluoroalkylene dioxy, perhalo lower alkylamino, perhalocyclopentylene, perhalocyclohexylene, perhalopyridineyl, perhalopyrazolidinediyl, perhalopyranylene, perhalopiperidylene, perhalophenylene, perhalonaphthalenediyl, perhalodecalinylene, oxadiazolylene, triazolylene, triazinylene and aryl perhalo lower alkylene wherein substituents on the said aryl group are selected from hydrogen, lower alkenyl, chloro, fluoro, lower alkoxy, nitro, nitroso, cyano, and alkoxy carbonyl.

17. The monotriazapentadiene of claim 16 wherein the —$(CXY)_m Z(CXY)_n$— radicals are perfluoroalkylene groups of 4 to 45 carbon atoms.

18. The monotriazapentadiene of claim 17 wherein the perfluoroalkylene groups are perfluorohexamethylene groups.

19. The monotriazapentadiene of claim 17 wherein the perfluoroalkylene groups are perfluorotetramethylene groups.

20. The monotriazapentadiene of claim 17 wherein the perfluoroalkylene groups are perfluorooctamethylene groups.

21. The triazapentadiene compound having at least one triazapentadiene unit of the formula:

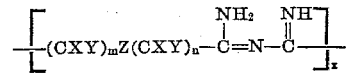

wherein each X is selected from chlorine and fluorine, each Y is selected from halogen and perhalo lower alkyl, $m$ and $n$ are positive integers greater than zero, $x$ is from one to one million, and —$(CXY)_m Z(CXY)_n$— is a polyperfluorooxyalkylene radical where each alkylene unit has from two to ten carbon atoms and the units are from 2 to 35 in number.

22. The triazapentadiene compound having at least one triazapentadiene unit of the formula:

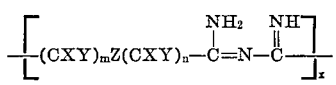

wherein each X and Y is fluorine, Z is oxygen, $m$ and $n$ are positive integers greater than zero, $x$ is from one to one million, and the sum of $m$ plus $n$ plus the number of equivalent units in Z is at least four.

23. The triazapentadiene polymer of claim 22 in which $m$ plus $n$ is four.

References Cited

UNITED STATES PATENTS 3,317,484   5/1967   Fritz et al. _____ 260—78.4
3,369,002   2/1968   Griffin _____ 260—78.4

JOSEPH L. SCHOFER, Primary Examiner

C. A. HENDERSON, Assistant Examiner

U.S. Cl. X.R.

117—128.4, 161; 252—51; 260—2, 29.1. 63, 79, 248, 290, 293, 307, 308, 310, 345.1, 564, 823

UNITED STATES PATENT OFFICE
CERTIFICATE OF CORRECTION

Patent No. 3,489,727 January 13, 1970

Edwin Dorfman et al.

It is certified that error appears in the above identified patent and that said Letters Patent are hereby corrected as shown below:

Column 16, lines 24 and 25, cancel "x is one to one million,".

Signed and sealed this 16th day of June 1970.

(SEAL)
Attest:

Edward M. Fletcher, Jr.
Attesting Officer

WILLIAM E. SCHUYLER, JR.
Commissioner of Patents